Jan. 3, 1967  C. M. SWEET  3,295,569
MACHINE FOR CUTTING WOOD WITH A FIXED BLADE
Filed May 31, 1962  4 Sheets-Sheet 1

INVENTOR.
Corlise M. Sweet

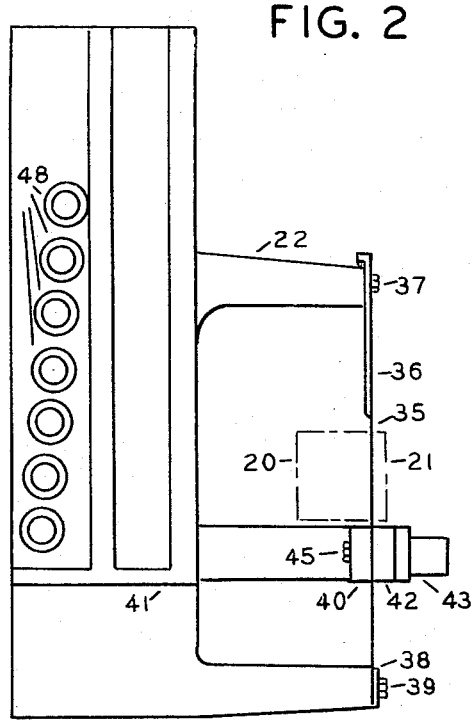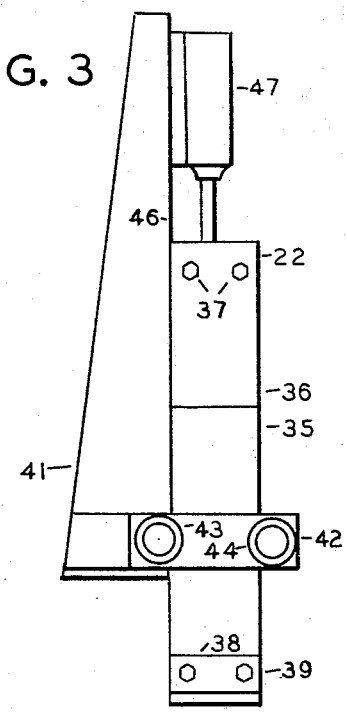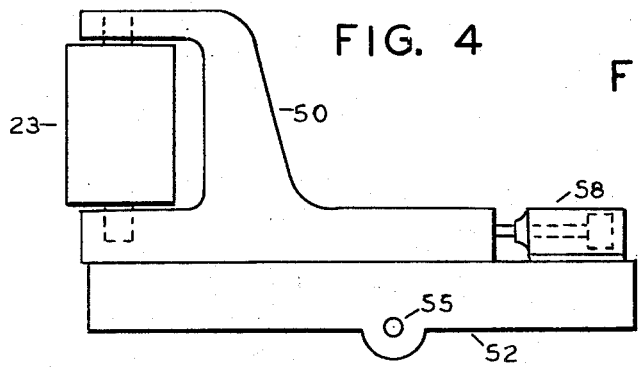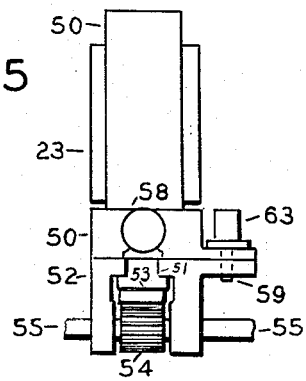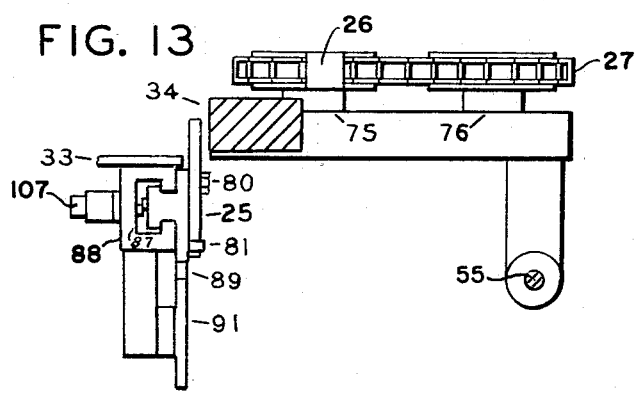

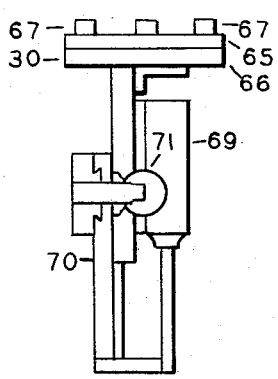
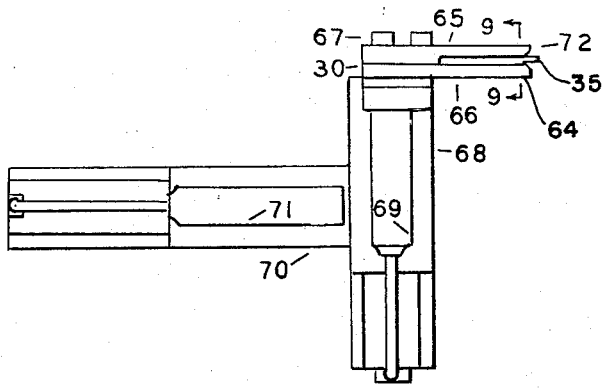
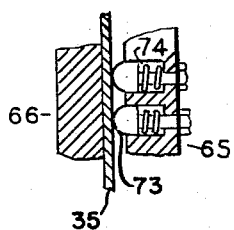
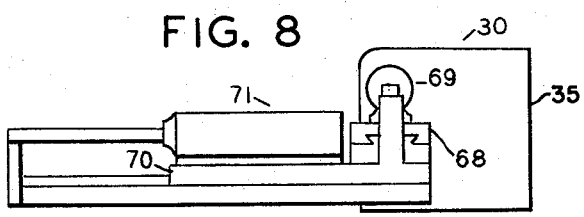
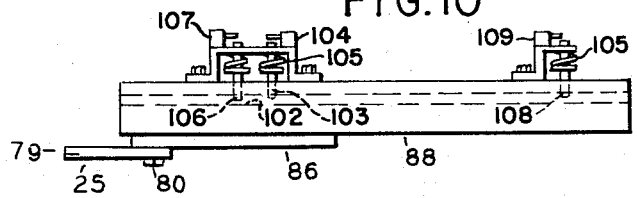
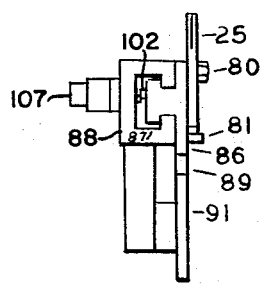
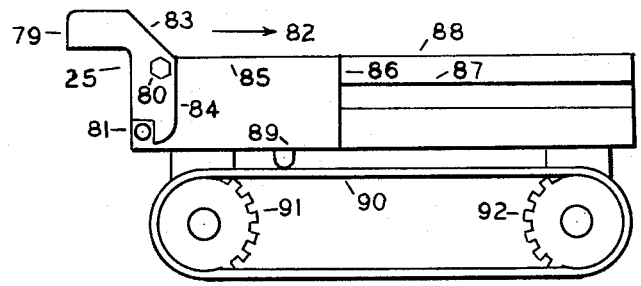

Jan. 3, 1967  C. M. SWEET  3,295,569

MACHINE FOR CUTTING WOOD WITH A FIXED BLADE

Filed May 31, 1962  4 Sheets-Sheet 4

INVENTOR.
Corliss M. Sweet
BY

United States Patent Office 3,295,569
Patented Jan. 3, 1967

3,295,569
MACHINE FOR CUTTING WOOD WITH A
FIXED BLADE
Corlise M. Sweet, 1000 E. Montana St.,
Milwaukee, Wis. 53207
Filed May 31, 1962, Ser. No. 199,011
9 Claims. (Cl. 144—175)

This invention relates to compressing wood and cutting the wood with a fixed blade. The method was described in application Serial Number 138,763, filed September 18, 1961 and now abandoned.

Application Serial Number 138,763 describes the method of cutting wood by this process but does not describe the structure required for doing the cutting. It is therefore an object of this invention to show a machine that will convey a timber to a fixed blade, hold the timber in the proper position for cutting the desired thickness of board, compress the section of wood being cut thereby preventing the wood from splitting, and supporting the sides of the blade to prevent the blade from bending.

A further object is to show how the thin blade can be adjusted vertically for cutting different size timbers and how the blade can be supported immediately above and below the timber.

Another object is to show how the blade supporting mechanism can be made to travel in front of the timber thereby gradually transferring the supporting of the blade from the blade support to the kerf in the timber.

A further object is to show how the blade support can be moved out of the path of the board that is being cut off.

Another object is to show how the mechanism for guiding the timber can be changed to cause the machine to cut different thicknesses of boards.

A further object is to show a conveying mechanism that will push the timber past the cutting edge of the blade without interfering with the mechanism for supporting the sides of the blade and the mechanism for compressing the wood.

Another object is to show that by using this method of cutting it will not be necessary to use machines with large wheels for rotating the blade.

A further object is to show that by eliminating teeth on the edge of the blade teeth scratches in the cut surface caused by bent teeth can be eliminated which will reduce the amount of wood that has to be removed in planning to make the board smooth.

Another object is to show that by using a short blade without teeth it is easier to sharpen than a band saw blade having teeth that is forty to fifty feet in length.

A further object is to show that by using a blade that does not have to bend the blade can be made harder, stronger, thinner, and does not require as much maintenance.

Another object is to show that because the blade does not require as much clearance or very little clearance more lumber can be obtained from a timber.

A further object is to show that by using small straight blades held in place by bolts that it requires less time to take the blade off the machine and replace it than it does to change a band saw blade that is forty to fifty feet in length.

Another object is to show that by using a fixed blade it is safer for men working around the machine than a blade that travels at a speed of two miles a minute and sometimes cuts through large nails in the timber.

The accompanying drawings illustrate a machine for cutting the wood and various parts of the machine that it is contemplated to be the best mode of carrying out the invention.

FIGURE 1 is a schematic plan view of a machine showing a timber having a board being cut from one side with an adjustably mounted fixed blade, a mechanism to adjust the blade for cutting different size timbers, a mechanism for cutting different thicknesses of boards, rolls for compressing the section of the timber being cut, a mechanism for supporting the sides of the blade, a mechanism for pushing the timber past the cutting edge of the blade, and rolls for holding the timber in the proper position for cutting.

FIGURE 2 is a schematic view taken from section 2—2 in FIGURE 1 showing the mechanism that moves the blade up or down for cutting different thicknesses of timbers, the air cylinders for locking the blade frame in different positions, and one of the air cylinders for clamping the blade below the timber.

FIGURE 3 is a schematic view of FIGURE 2 looking at FIGURE 2 from the right side showing the air cylinder that moves the blade frame up and down and the air cylinders that clamp the blade below the timber.

FIGURE 4 is a schematic side elevation of the adjustable roll that determines the thickness of the board to be cut looking at it from section 4—4 in FIGURE 1 showing the roll, the knee the roll is mounted on, the air cylinder that moves the knee to different positions, and the shaft that connects the knee to the other knees.

FIGURE 5 is a schematic end elevation of FIGURE 4 looking at FIGURE 4 from the right side showing the groove it slides in, the air cylinder that moves it, one of the air cylinders that lock it in place, and a pinion and shaft that connect it to the adjacent knees.

FIGURE 6 is a schematic plan view of the mechanism for supporting the sides of the blade consisting of a blade support having a groove to support both sides of the blade, an air cylinder and slide to move the blade support parallel with the sides of the blade as the timber moves onto the blade, and an air cylinder and slide to move the blade support at right angles to the side of the blade and out of the path of the board being cut from the timber.

FIGURE 7 is a side elevation of FIGURE 6 looking at FIGURE 6 from the left side showing the dove tail groove on which the blade supporting mechanism can be moved parallel with the side of the blade.

FIGURE 8 is a side elevation of FIGURE 6 looking at FIGURE 6 from the bottom side showing the dove tail groove on which the blade support can be moved at ninety degrees with the side of the blade.

FIGURE 9 is an enlarged schematic view through section 9—9 in FIGURE 6 showing round headed bolts mounted on springs that push against the side of the blade and provide a means of holding the blade against one side of the blade support.

FIGURE 10 is a schematic plan view of a reciprocating mechanism that pushes the timber into the blade.

FIGURE 11 is a schematic side elevation of FIGURE 10, looking at FIGURE 10 from the bottom side, showing a tooth for pushing the timber that can rotate to allow the timber to pass over it and a chain and sprocket to reciprocate the tooth.

FIGURE 12 is a schematic end elevation of FIGURE 11 looking at FIGURE 11 from the left side showing the groove that the tooth mechanism slides in and the structure to support the sprockets that reciprocate the tooth.

Figure 1:
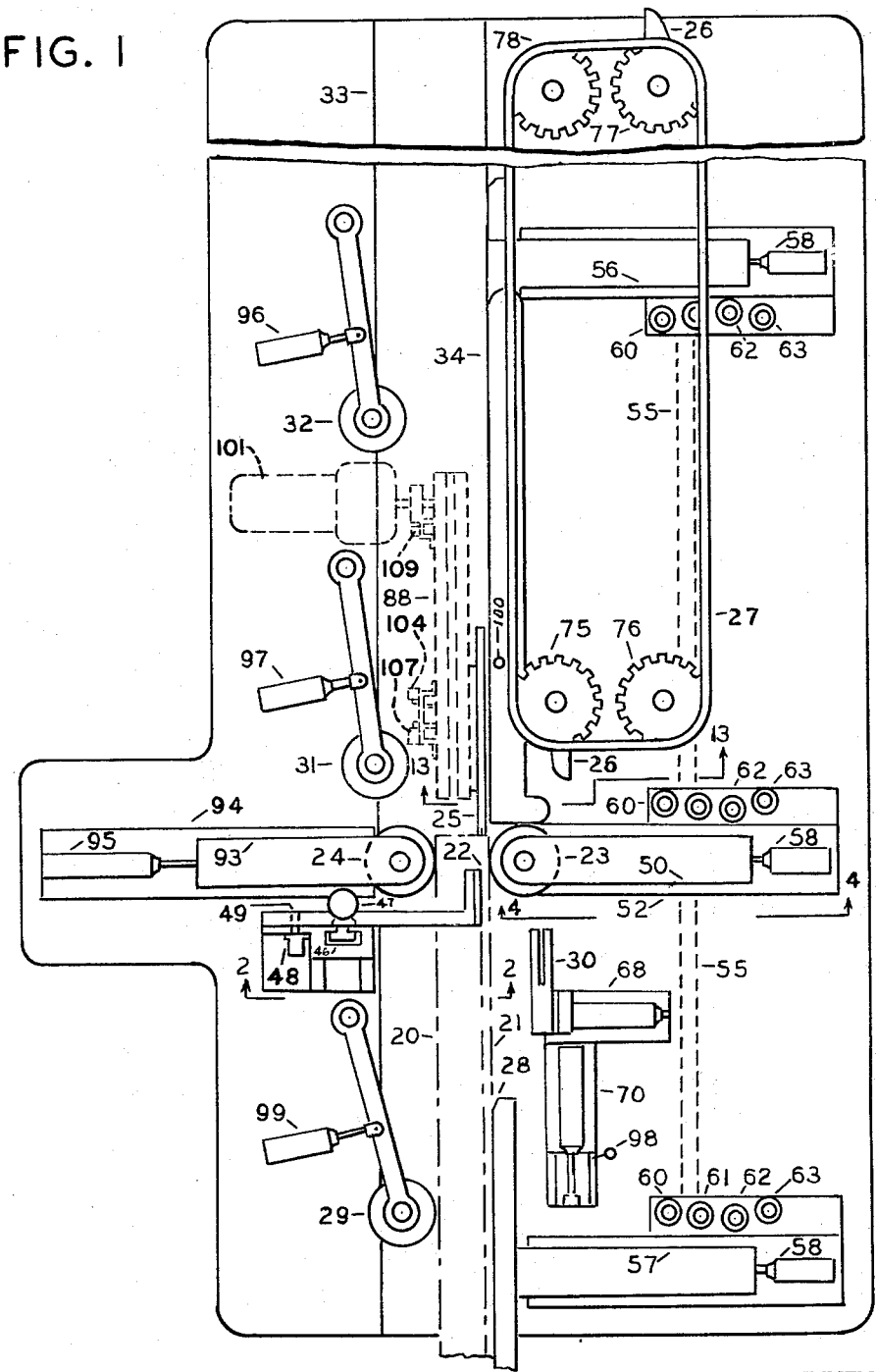

FIGURE 13, Sheet 2, is a schematic view through section 13—13 in FIGURE 1 showing only the tooth reciprocating system for moving the timber, the chain conveyor for moving the timber, the guide along which the timber slides, and the shaft that moves the knees.

Figure 14:
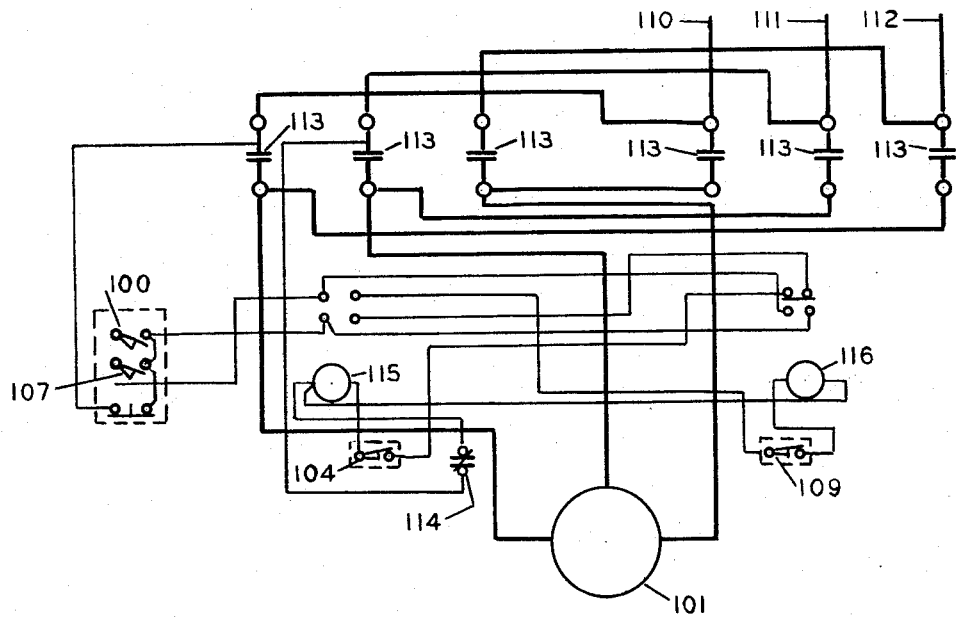

FIGURE 14 is a schematic wiring diagram for the motor that moves the reciprocaating conveyor shown in FIGURES 1, 10, 11, 12, and 13.

Figure 15:
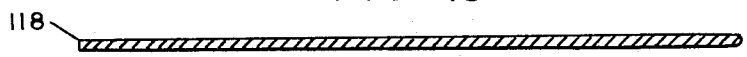

FIGURE 15 is a schematic section view of a blade that has a square cutting edge.

Figure 16:

FIGURE 16 is a schematic section view of a blade that has been formed so the cutting end is slightly thicker than the other sections of the blade.

Figure 17:

FIGURE 17 is a schematic section view of a blade that has the cutting edge sharpened like a knife.

Figure 18:
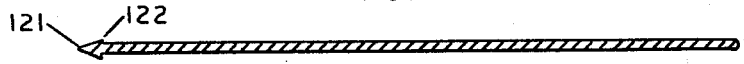

FIGURE 18 is a schematic section view of a blade that has been sharpened like a knife and formed thicker than the blade in the section back of the cutting edge.

FIGURE 1 shows a plan view of the machine in which a timber 20 is having a board 21 cut from one side. The timber is being cut by a blade not shown that is held in a frame 22. The section of the timber that is being cut by the blade is compressed between two rolls 23 and 24. Compressing of the wood by the rolls 23 and 24 prevents the timber from splitting and forces the blade to crush the wood and provide a kerf for the blade to pass through the wood. The timber 20, as shown, is pushed by a reciprocating and rotating tooth 25. Previous to being pushed by the tooth 25 the timber was pushed by the tooth 26 that is driven by chain 27. The timber, as shown, is held against the guide 28 by the roll 29. The blade support 30 has moved out of the path of the board 21. The rolls 31 and 32 are not engaged in doing any work as shown. When the next timber to be cut is conveyed along the surface 33 by the chain 27 the rolls 31 and 32 will hold the timber against the guide 34.

FIGURE 2 shows the mechanism for holding the fixed blade 35 which is adjustably mounted. The upper part of the blade 35 is preferably brazed to a thicker part 36 that is held by bolts 37 to the frame 22. The lower side of the blade 35 is clamped to the frame 22 by bar 38 that is held by bolts 39. Blade 35 is preferably brazed to bar 38. Below the timber 20 the blade 35 is clamped between part 40 that is attached to the frame 41 and the bar 42. Bar 42 is clamped to part 40 by air cylinders 43 and 44 that have nuts 45 on their piston rod ends. Fastening the blade 35 to the thick part 36 above the timber and clamping the blade below the timber with parts 40 and 42 increases the rigidly of the blade and the accuracy of the lumber cut.

The blade frame 22 is moved along the groove 46 by the air cylinder 47. Groove 46 is shown in FIGURE 1. The blade frame 22 is locked to the frame 41 by one of the air cylinders 48 that can push a pin 49 through the frame 41 into the blade frame 22. This is shown in FIGURE 1. It will be noted that the cylinders 48 are slightly offset from each other. By offsetting the cylinders 48 from each other the machine operator can place air pressure on one of the cylinders 48 and move the frame 22 slowly with the cylinder 47. When the frame 22 arrives at the correct location one of the pins 49 will move into its corresponding hole in the frame 22 and lock it in position.

Instead of raising and lowering the blade frame 22 with air power electric power could be substituted. This would consist of replacing the air cylinder 47 with a geared electric motor and replacing the air cylinders 48 with electric switches. The machine operator can then energize the electric switch for the position he wants the frame to move to and start the motor. When the frame 22 contacts the electric switch that has been energized it will stop the motor.

FIGURES 4 and 5 shows part of the mechanism for cutting different thicknesses of boards. The distance of the roll 23 from the blade 35 determines the thickness of the board that is cut. The roll 23 has journals on both ends that fit in bearings in the knee 50. The knee 50 slides in the groove 51 that is located in the frame 52. A gear rack 53 is attached to the knee 50 and moves with the knee. Gear pinion 54 is rotated by the rack 53. The pinion 54 is on a set shaft 55 that is attached to similar pinions in knees 56 and 57, shown in FIGURE 1. The purpose of the rack, pinion and shaft is to connect the knees 50, 56, and 57 together and make them move simultaneously in the same direction. Knees 56 and 57 are similar to knee 50 except that they have a low flat surface that acts as a guide for the timber instead of a roll 23. Knees 56 and 57 are the same height as guide 34 in FIGURE 13. Knees 50 and 56 are connected by timber guide 34. Knee 57 is attached to timber guide 28. Each of the knees has an air cylinder 58 that pushes the knee forward and backward. Knee 50 is locked to the frame 52 by one of several pins 59 that pass through a hole in the knee 50 and into a corresponding hole in the frame 52. This is shown in FIGURE 5. The pins are pushed by one of the air cylinders that are numbered 60, 61, 62, and 63. The air cylinders are offset from each other as shown in FIGURE 1. By offsetting the air cylinders from each other the machine operator can place air pressure on one of the air cylinders 60 to 63 and slowly move the knee 50 with air cylinder 58. When the air cylinder that has air pressure placed on its piston comes to the hole in the frame that corresponds with the hole in the knee the air cylinder will push the corresponding one of the pins 59 into the hole and lock the knee and frame together. The other knees 56 and 57 also have corresponding cylinders 60, 61, 62, and 63. All cylinders with the same numbers are connected together by air supply pipes and valves. By connecting all like cylinders together and controlling them simultaneously all of the knees can be moved to the location desired for cutting a certain thickness of board and locked in that position.

FIGURES 6, 7, 8 and 9 show a blade support mechanism that supports the sides of the blade 35. The purpose of the blade support is to make it possible to use thinner blades and by preventing the blade from bending cut more accurate lumber.

FIGURE 6 is a plan view of the blade support mechanism that is similar to the view shown in FIGURE 1. The difference between the view shown in FIGURES 1 and 6 is that in FIGURE 6 air pressure has been placed on both cylinders so that the piston rods have been pushed out the maximum amount. In the position shown in FIGURE 6 the blade 35 will be completely in the groove 64 of the blade support 30. The blade support 30 is made of two parts 65 and 66 that are held together by bolts 67. The blade support 30 is attached to the slide 68. Slide 68 is moved by the air cylinder 69. The purpose of the slide 68 is to move the blade support 30 out of the path of the timber after the blade 35 completely enters the timber. The slide 68 is mounted on slide 70. Slide 70 is at right angles to slide 68. Air cylinder 71 moves slide 70 and the blade support 30 parallel with the side of the blade 35. The purpose of the slide 70 and the air cylinder 71 is to hold the end of the blade support 72 against the end of the timber that is being cut. Before the blade 35 starts cutting the timber the end of the blade support 72 is close to the cutting edge of the blade 35. When the blade starts cutting the end of the timber pushes against the surface 72 on the blade support thereby causing the surface 72 to move towards the back of the blade 35. In this way the pressure supporting the sides of the blade is gradually transferred from the groove 64 to the kerf cut in the timber by the blade 35.

FIGURE 9 shows how one side of the blade support 65 has spring loaded plungers for holding the blade 35 against one side of the blade support. The plungers consist of round headed bolts 73 with springs 74 that press the round head of the bolt against the side of the blade 35. This has two advantages. The plungers hold the blade against one side of the blade support thereby preventing the blade from bending and causing the blade to start cutting straight. The other advantage is that the thick section 36 to which the blade 35 is attached can enter the groove 64 by depressing the springs 74. Therefore with the mechanism shown in FIGURE 6 different thicknesses of timbers can be cut and the blade will be supported directly above the timber, directly below the timber and on both sides of the blade.

The conveying of the timber through the machine consists of two systems, a chain conveyor and a reciprocating mechanism. The chain conveyor consists of flights 26 that push the timber, a chain 27 to pull the flights 26, sprockets 75, 76, 77, and 78 to pull the chain 27, and a motor to pull the sprockets that is not shown. The chain flight 26 pushes the timber to a short distance from the blade 35. The reciprocating system pushes the timber the remaining distance to the blade 35. The reason for using two systems is that with the rolls 23 and 24, the blade support shown in FIGURE 6, and the clamping of the blade shown by items 40 and 42 it would be difficult to avoid interference if flight 26 was used to push the timber past the blade 35.

The reciprocating system for pushing the timber is shown in FIGURES 10, 11, and 12. The tooth 25 pushes the timber with the surface 79. The tooth can rotate about the pin 80. When the tooth 25 is pushing the timber the pin 81 acts as a stop and prevents the tooth from rotating. When the tooth 25 is moved backwards, in the direction shown by the arrow 82, the tooth rotates counterclockwise when the section 83 on the tooth comes in contact with the timber to be cut. Rotating of the tooth allows surface 84 on the tooth to move up to surface 85 on the frame. When the surface 84 is flush with surface 85 the timber can pass over the tooth 25 with no interference. After the timber passes over the tooth 25 the tooth being heavier on one side of the rotating point 80 than on the other side of the rotating point it rotates to the position shown in FIGURE 11. In this position it is ready to push the timber into the blade 35.

The tooth 25 is mounted on the slide 86. Slide 86 slides in groove 87 in frame 88. Slide 86 is moved by chain attachment 89. Chain attachment 89 is moved by chain 90. Chain 90 is mounted on two sprockets 91 and 92. The sprockets are driven by a motor not shown.

FIGURE 13 shows that most of the reciprocating mechanism that pushes the timber is below the floor plate 33 on which the timber slides, and all of the chain conveyor system that pulls the flights 26 is above the floor plate 33. This was done to avoid interference between the two systems.

The compressing of the wood in the section where it is being cut is done by the roll 24. Roll 24 is mounted on a knee 93, FIGURE 1. Knee 93 is similar to knee 50 shown in FIGURES 4 and 5 with the exception that it does not have a gear rack and it does not have cylinders 60 to 63 to lock it in place. Knee 93 slides in frame 94. Frame 94 is similar to frame 52 with the exception that it does not have bearings for a shaft 55 and it does not have a flange for locking pins 59. Knee 93 is moved by hydraulic cylinder 95. On some applications an air cylinder could be substituted for the hydraulic cylinder. The size of the cylinder 95 will depend on the type of wood that is to be cut, the size of the timber, and the thickness of the blade.

It should be understood that in compressing the outside of the workpiece 20 by the rolls 23 and 24 the pressure on the workpiece must be much greater than the amount applied in the conventional resaw. The reason for this is when the blade 35 is pushed into the wood it displaces wood. This displaced wood acts as a wedge in the interior of the workpiece. This wedge must be compressed into the wood from the outside of the workpiece or the wedge will split the workpiece. Split wood is not satisfactory because it is not uniform in thickness and can not be used where boards are regularly used. Therefore in this machine the rolls 23 and 24 must exert considerable pressure on the workpiece 20 to prevent it from being split.

The operation of the machine will consist of making several adjustments. The first adjustment will be to position the blade frame 22 for the thickness of the timber to be cut. This will consist of releasing the pressure on the air cylinders 43 and 44, FIGURES 2 and 3, placing air pressure on one of the air cylinders 48, moving the blade frame 22 with air cylinder 47 until one of the pins 49 moves into its corresponding hole in the blade frame 22 and locks the frame in place. When the frame 22 is locked in place air pressure will be placed in cylinders 43 and 44 to clamp the blade 35.

The next step will be to move the blade support mechanism into place. This will consist of placing air pressure on the side opposite of the piston rod in cylinder 69 and moving the piston rod out to the end of its stroke. When the piston in cylinder 69 stops air pressure is placed on the side opposite to the piston rod in cylinder 71. This will cause the groove 64 in the blade support to enclose the blade 35.

The next step is to adjust the guides 28 and 34 for the thickness of the board to be cut. This consists of placing air pressure on one of the air cylinders 60 to 63 and moving the knees 50, 56 and 57 with the air cylinder 58 until one of the pins 59 is pushed into the corresponding hole in the frame.

The next step is to move the timber to be cut onto the floor plate 33. This will be done by a conventional timber conveyor not shown. The roll 32 with the aid of air cylinder 96 pushes the timber against the guide 34. In this position one of the flights 26 can move the timber along the guide 34. As the timber is moved along the guide 34 roll 31 is pushed against the side of the timber with air cylinder 97. This assists in holding the timber firmly against the guide 34.

When the timber approaches the blade 35 hydraulic pressure is placed in the cylinder 95. This causes roll 24 to compress the timber in the section in which it is to be cut and thereby prevents the timber from splitting when the blade 35 is forced into it.

When the timber arrives at the blade 35 it is under compression. The flight 26 forces the timber into the blade 35. The blade 35 crushes a kerf in the wood as the timber is moved into it. The blade 35 can be made of a heat treated steel having a tensile strength of over 100,000 pounds per square inch. Most timbers have crushing strengths of 3,000 to 6,000 pounds per square inch. It should be noted that if stronger blades are desired metals having tensile strengths of over 200,000 pounds per square inch have been developed for air craft.

In application 138,763, filed September 18, 1961 different types of blades were shown. One of the blades had a sharpened edge. When this type of blade is used the wood is cut by the blade and then compressed by the side of the blade to provide a kerf. In this way combined cutting and crushing is used to cut the board from the timber.

The board and timber that has been cut presses on the surface 72 of the blade support 30. This pushes the blade support 30 towards the back of the blade 35 and transfers the forces supporting the sides of the blade from the groove 64 to the kerf cut in the timber. When the timber has pushed the blade support 30 past the blade 35 the machine operator can reverse the air pressure in the cylinders 69 and 71. This will move the blade support out of the path of the board 21. If it is desired to move the blade support automatically away from the blade an electric switch 98, FIGURE 1, can be used. The electric switch would be energized when the slide 70 contacts it. The electric switch can operate three way valves on both cylinders 69 and 71. Operation of the valves would change the air pressure from one side of the cylinder to the opposite sides and thereby move the blade support away from the timber.

As the timber continues to move through the machine the machine operator will place air pressure on air cylinder 99. This will cause the roll 29 to hold the timber against the guide 28.

When the flight 26 approaches the sprocket 75 the machine operator will operate the motor that turns the sprockets 91 and 92, FIGURE 11, and thereby cause the tooth 25 to start pushing the timber into the blade. The motor that drives the sprockets 91 and 92 could be geared to move the tooth 25 slightly faster than the chain pulling flight 26, or the chain pulling flight 26 could be stopped for a short period. This would prevent any trouble when the flight 26 passed around the sprocket 75.

If it is desired to make it easier for the machine operator an electric switch 100, FIGURE 1, could be used to operate the reciprocating tooth 25. It would operate as follows. The tooth 26 would operate the electric switch 100. The electric switch 100 would start the motor 101 that rotates sprockets 91 and 92. The tooth 25 would push the timber 20 past the cutting edge of the blade 35 as the tooth 25 moves toward the blade frame 22, FIGURE 1, the cam 102, FIGURES 10 and 12, on the slide 86 contacts the pin 103 that is held away from the limit switch 104 by the spring 105. The cam 102 pushes the pin 103 against the limit switch 104 which stops the flow of electric current to the motor 101 in FIGURE 1. The motor continues to rotate or coast for a short period after the flow of electric current is stopped. The coasting of the motor moves the cam 102 to the pin 106, FIGURE 10. Pin 106 closes the contact points on limit switch 107. This causes the motor 101 to reverse and move the tooth 25 away from the blade frame 22 in FIGURE 1. When the tooth 25 is a sufficient distance from the blade frame 22 the cam 102 contacts the pin 108, FIGURE 10. Pin 108 operates the switch 109 and stops the motor 101. The mechanism is then ready to push another timber past the blade frame 22.

The wiring diagram for starting and stopping the motor is shown in FIGURE 14. This is a standard diagram that was taken from a manufacturer's catalog. The overload relays are not shown in the diagram. The parts to stop and start the motor 101 that have not been mentioned are as follows. 110, 111 and 112 are the wires for the three phase power. Items 113 are normally open contacts. 114 is a normally closed contact. 115 is the forward coil. 116 is the reversing coil.

It should be noted there are other means of controlling the motor which would have an advantage in cutting certain size timbers. For example an electric brake on the motors, could be used. The different methods of controlling the motor will not be described here because they are well known in industry.

After the board is cut from the timber the timber can be conveyed around to the starting point by the same type of conveying equipment that is used on horizontal and vertical resaws that convey timbers from the back of the machine to the position where the timber enters the machine.

On some operations the machine described above could be simplified. For example some sawing operations require that only one thickness of board be cut. This type of operation would not require moving the knees 50, 56, and 57. This would eliminate the sliding surfaces on the knees, the racks, pinions, and all the cylinders on the knees. Other wood cutting operations only cut one width of board. This type of operation would eliminate moving the frame 22 up and down and all the air cylinders on the blade frame mechanism shown in FIGURES 2 and 3. Other operations only cut narrow boards. When very narrow boards are cut it would not be necessary to support the sides of the blade with the blade support shown in FIGURES 6, 7, 8 and 9

FIGURES 15, 16, 17 and 18 show different cross sections of blades that were previously described in application Serial Number 138,763, filed September 18, 1961. The blades have a straight cutting edge as shown on blade 35 in FIGURE 3. In FIGURE 15 the cutting edge 118 is shown to be square with the sides of the blade. In FIGURE 16 the cutting edge 119 is shown to be larger than the thickness of the blade. In FIGURE 17 the cutting edge 120 is shown to be knife edged. In FIGURE 18 the cutting edge 121 is shown to be knife edged and the section 122, back of the cutting edge, is made thicker than the thickness of the blade.

It is believed that the method of cutting wood described above will be more economical than some of the present methods. Most small saw mills now use circular saws because they find it difficult to hire skilled men to maintain the wide blade used on large band mills. The circular saws are much thicker than the blades contemplated for use on this machine and therefore it is believed this machine will reduce saw dust waste considerably.

Another advantage of this machine is that it does not require the clearance for the blade that is now used on most sawing operations. The present saws cut a kerf that is approximately twice the thickness of the blade. This is necessary to avoid friction between the fast moving blade and the sides of the kerf. Using this machine the blades will not require any clearance on some operations and in most instances will not require clearances of over twenty percent of the blades thickness.

In addition to not requiring clearance for the blade it is the intention that the cutting edge of the blade will be approximately straight and will not have teeth that protrude above the blade. In present sawing practice the thickness of the blade is dependent on the height of the tooth above the blade. The reason for this is that the tooth is like a cantilever beam. The longer a cantilever beam is the larger it must be at its base to support the beam. Similarly with a saw the larger the tooth the thicker the saw blade must be to prevent the tooth from bending. The blade used in this machine does not require teeth that protrude above the blade, therefore because the blade does not have a tooth to bend it the blade can be made thinner. A thinner blade will produce more lumber from a timber.

Another advantage of this method of cutting is that because the blade does not have teeth that can be bent out of the plane cut by the other teeth it can not place tooth scratches in the cut surface. This will reduce saw dust waste. At present it is necessary to saw boards thick enough so that the tooth scratches can be planed out or dressed out in a later operation. By eliminating the tooth scratches the boards will not have to be sawed as thick on some sawing operations.

In conventional sawing operations the band saw blade has to bend in traveling around a wheel. A steel blade that has to bend can not be as hard or as strong in compression as a blade that does not have to bend. In this machine the blade does not have to bend, and it does not have large teeth that can be bent therefore the blade can be made harder. Harder blades are stronger in compression than softer blades and they wear longer. Therefore by using a harder blade the blade can be made thinner. Thinner blades cut a smaller kerf in the timber and produce more lumber from the timber.

In the above it has been shown how the blade can be made thinner by eliminating the teeth on the blade and using harder metals. It should further be noted that as the thickness of the blade decreases the amount of wood it is necessary to crush to make the kerf is decreased. Decreasing the amount of wood it is necessary to crush will decrease the force on the blade and in some wood cutting operations it will allow further reductions in the thickness of the blade.

Another advantage of this method of cutting is that the blade is small and when it becomes dull it can be changed quickly. Large circular saws that are on arbors and wide band saws that are forty to fifty feet in length require more time to change. In most small mills when the saw has to be changed the whole mill has to be shut down. Due to the time required for changing some saws are operated when they are dull which results in inaccurate lumber.

There also may be other advantages to this method that are not known at present. For example the harder blade may stay sharper longer than expected because wood that has not been dried contains water which will keep the non-moving blade cooler than a blade that is moving at high speed. Another example is by crushing the wood it may place a harder surface on the board which might have advantages.

In the above the word timber has been used to describe the wood being cut as this is a more simple term than stating the wood is of rectangular shape. It should be noted that this type of machine can be used for cutting small rectangular pieces of wood as well as large timbers.

In conclusion it is believed this method of cutting with a non-moving blade will reduce saw dust waste, reduce the amount of wood that has to be removed in some dressing operations, reduce saw sharpening time, reduce the cost of blades, and it will provide safer working conditions for the men working near the machine.

Various embodiments of the invention may be employed within the scope of the accompanying claims which particularly point out and distinctly set for the subject matter regarded as the invention.

I claim:
1. A machine for cutting a board from a timber having a specific gravity of over .25, comprising a fixed thin blade that is held in position for cutting, means for fastening the opposite ends of said blade to the machine whereby the timber passes between the fastened ends of said blade and the blade can be thinner than if only one end of the blade was fastened to the machine, means to hold a timber in the correct position for cutting a board from one side of the timber, means to compress the section of wood being cut thereby preventing the wood from splitting, and means to exert a pushing force on the trailing end of said timber to push the timber past said blade whereby using the above machine space is provided for the thin blade to pass through the timber by compressing the wood on the sides of the board instead of providing space by wasting wood in sawing a kerf or providing space by bending and fracturing the wood.

2. The construction of claim 1 in which the means to hold the timber in the correct position for cutting a board from one side of the timber has means for changing its distance from the blade thereby providing for cutting different thicknesses of boards from one side of a timber.

3. The construction of claim 1 in which the means that pushes the timber into the blade comprises a chain conveyor and a reciprocating mechanism, said chain conveyor provides a means for pushing the timber partly past the blade, and said reciprocating mechanism completes the means for pushing the timber past the blade's cutting edge thereby providing means for pushing the timber into the blade without interfering with the means for supporting the blade or the means of compressing the wood.

4. A machine for cutting a board from a timber, comprising an adjustably mounted fixed blade that does not require clearance on the sides of the blade thereby reducing the thickness of the kerf, said blade having a cutting and compressing edge less than 5/32 inch in thickness, a means to hold said blade in position for cutting a board from a timber, a blade guide that provides means for supporting both sides of said blade before it moves into the said timber, a means for moving said blade guide out of the path of the timber after the blade moves into the timber, a means to compress the wood being cut by said blade thereby reducing the tendency of the timber to split, a means to hold said timber in the correct position for cutting and a means to push said timber onto the blade.

5. The construction of claim 1 in which said blade is less than 5/32 inch thick.

6. A machine for cutting a board at least 5/8 inch in thickness from a timber that is safer for men working near the machine than conventional machines that use very fast moving saws, comprising a machine having an adjustably mounted fixed blade, said machine having means for holding said blade from opposite sides of said timber for cutting a board from said timber, said machine having means for holding said blade stationary during the time said board is cut from said timber, said machine having means for compressing the wood in the section being cut thereby preventing the wood from splitting when said timber is forced onto the blade, and said machine having means for pushing on the trailing end of said timber to move the timber past the blade at a conveyor speed to cut a board from said timber, whereby using said machine men working near the machine are not in danger of flying saw teeth that break off from a saw moving at high speed when the saw cuts a large nail embedded in the timber.

7. A machine for cutting a board from a timber, comprising a machine, said machine having a thin fixed blade that is held in position for cutting, means for fastening the opposite ends of said blade to the machine whereby the timber passes between the fastened ends of said blade, means to hold a timber in the correct position for cutting a board from one side of the timber, means to compress the section of wood being cut thereby preventing the wood from splitting, means for exerting a pushing force on the trailing end of said timber to push the timber past said blade, said machine having a movable blade support mechanism, said blade support mechanism having a groove in a blade support into which the non-cutting edge of the blade can enter thereby supporting both sides of the blade, said blade support mechanism having means to move the blade support into position for supporting both sides of the blade when the blade starts cutting the timber, means to gradually move the blade support towards the back of the blade thereby transferring the supporting of the blade from the blade support to the kerf in the timber and means for moving the blade support out of the path of the timber to provide space for the timber to move past the blade.

8. A machine for cutting a board from a timber, comprising a machine, said machine having a thin fixed blade that is held in position for cutting, means for fastening the opposite ends of said blade to the machine whereby the timber passes between the fastened ends of said blade, means to hold a timber in the correct position for cutting a board from one side of the timber, means to compress the section of wood being cut thereby preventing the wood from splitting, means for exerting a pushing force on the trailing end of said timber to push the timber past the blade, said machine having a movable blade support mechanism, said blade support mechanism having a groove in a blade support into which the non-cutting edge of the blade can enter thereby supporting both sides of the blade, said groove having spring plungers on one side of the groove that hold the blade against the opposite side of the groove thereby further supporting the blade and increasing the accuracy at which the blade starts cutting, said blade support mechanism having means to move the blade support into position for supporting both sides of the blade when the blade starts cutting the timber, means to gradually move the blade support towards the back of the blade thereby transfering the supporting of the blade from the blade support to the kerf in the timber and means for moving the blade support out of the path of the timber to provide space for the timber to move past the blade.

9. A machine for cutting a board from a timber, comprising a machine, said machine having a thin fixed blade that is held in position for cutting by a blade frame, means for fastening the opposite ends of said blade to the blade frame whereby the timber passes between the fastened ends of the blade, said blade frame holds the upper section of the blade with a part having a smaller cross section than said frame but larger than said blade whereby clearance is provided for the mechanism that compresses the wood, said part that holds the upper section of said blade being close to the upper surface of said timber, the lower section of said blade being attached to the lower side of said blade frame, means to clamp the blade to the machine in a position close to the lower surface of said timber, means for raising and lowering the blade frame to provide the correct length of blade for cutting different thicknesses of timbers whereby using said blade frame will increase the rigidity of the cutting blade in cutting different thicknesses of timbers by using a blade only slightly longer than the thickness of timber to be cut, means to hold the timber in the correct position for cutting a board from one side of the timber, means to compress the section of wood being cut thereby preventing the wood from splitting, and means for exerting a pushing force on the trailing end of said timber to push the timber past the blade.

References Cited by the Examiner

UNITED STATES PATENTS

| | | | |
|---|---|---|---|
| 16,816 | 3/1857 | Washburn | 144—184 |
| 339,866 | 4/1886 | Davis | 144—184 |
| 1,082,985 | 12/1913 | Wilder et al. | 83—19 |
| 1,452,179 | 4/1923 | Brenner. | |
| 1,464,924 | 8/1923 | Drummond | 143—159 |
| 1,769,927 | 7/1930 | Langill et al. | 144—249 X |
| 2,146,074 | 2/1939 | Kelley | 144—176 |
| 2,356,324 | 8/1944 | Kendle et al. | 144—194 |
| 2,432,807 | 7/1947 | Zindrick | 144—175 |
| 2,525,189 | 10/1950 | Thomas | 198—24 |
| 2,657,784 | 11/1953 | Stoker | 143—51 X |
| 2,684,697 | 7/1954 | Ferrari | 143—160 X |
| 2,722,247 | 11/1955 | Schroeder et al. | 144—249 X |
| 2,821,220 | 1/1958 | Nicholson | 144—249 |
| 2,920,741 | 1/1960 | Rysti | 198—106 X |

FOREIGN PATENTS 1,747    1/1891    Great Britain.

HAROLD D. WHITEHEAD, *Primary Examiner.*